United States Patent [19]
Muta et al.

[11] 3,720,740
[45] March 13, 1973

[54] LOW PRESSURE SINTERING OF BORON NITRIDE USING LOW THERMAL EXPANSION STATIC SINTERING MOLDS

[75] Inventors: Akinori Muta; Yukio Hayakawa, both of Tokyo; Makoto Manaka, Hitachi, all of Japan

[73] Assignees: Kabushiki Kaisha Hitachi Seisakusto; Hitachi Kasei Kogyi Kabushiki Kaisha, Tokyo, Japan

[22] Filed: June 24, 1970

[21] Appl. No.: 49,516

Related U.S. Application Data

[63] Continuation-in-part of Ser. No. 830,176, April 22, 1969, abandoned, which is a continuation of Ser. No. 482,268, Aug. 24, 1965, abandoned.

[52] U.S. Cl. ..................264/65, 106/55, 264/63, 264/125, 264/332
[51] Int. Cl.....C04b 35/58, C04b 33/32, C04b 33/64
[58] Field of Search .....264/125, 332, 65, 57; 106/55

[56] References Cited

UNITED STATES PATENTS

| | | | |
|---|---|---|---|
| 3,370,113 | 2/1968 | Goeddel | 264/57 |
| 3,660,027 | 5/1972 | Mandorf, Jr. et al. | 264/332 |
| 3,673,118 | 6/1972 | Mandorf, Jr. et al. | 264/66 |
| 2,854,376 | 10/1958 | Taylor | 75/205 |
| 3,058,809 | 10/1962 | Taylor | 106/55 |
| 2,296,305 | 9/1942 | Roberts | 264/55 |
| 1,548,808 | 8/1925 | Miller | 264/332 |

FOREIGN PATENTS OR APPLICATIONS 1,073,936  6/1967  Great Britain.......................264/332

*Primary Examiner*—Donald J. Arnold
*Assistant Examiner*—John H. Miller
*Attorney*—Robert E. Burns and Emmanuel J. Lobato

[57] ABSTRACT

Boron nitride articles are manufactured by first cold pressure molding boron nitride powder and then sintering the resultant boron nitride article while the article is confined in a sintering mold so that the free expansion of the article during the sintering process is restricted.

13 Claims, No Drawings

LOW PRESSURE SINTERING OF BORON NITRIDE USING LOW THERMAL EXPANSION STATIC SINTERING MOLDS

This is a continuation-in-part of our copending application Ser. No. 830,176, filed Apr. 22, 1969 and now abandoned, which in turn is a continuation of our application Ser. No. 482,268, filed Aug. 24, 1965 and now abandoned.

This invention relates to a method for molding boron nitride which is referred to hereinafter as BN. More particularly, the present invention concerns a new procedure for molding BN by sintering.

BN has a wide range of uses due to its unique combination of excellent and desirable properties, including high electrical insulating characteristics, good lubricating properties, high resistance to heat, high thermal conductivity, and excellent resistance to chemical agents. However, BN produced currently is inevitably in the form of a fine powder having a particle size of a micron or less. Thus, in actual practice, fine BN powder is used to manufacture articles by molding and sintering.

In general BN articles have been fabricated into shaped products by press-molding and heat-sintering. The molding methods for manufacturing shaped BN articles may be divided into the following two broad classifications.

1. The method of hot-pressing, wherein heat-sintering at about 1700° to 2200°C. is carried out simultaneously with a press-molding procedure.

2. The method of cold-pressing, wherein boron nitride powder is first subjected to pressure-molding after which, the particle thus produced is subjected to a heat-sintering operation.

Method 1 hot-pressing is difficult and costly to carry out. In this procedure, pressing is carried out at high temperature, and the facilities necessary for such an operation require a large capital expenditure. Moreover, this procedure has a number of serious disadvantages particularly for a mass production operation, since the work efficiency is particularly low.

Method 2 cold-pressing has been found to be generally unsatisfactory since it has been difficult to produce high density products by this procedure and in addition, the thermal and mechanical properties of products produced by this procedure are poor.

Boron nitride powder consists of anisotropic layer-formed crystals in thin lamellar form. Thus, when BN powder is subjected to cold-pressing, each crystal is put under considerable strain resulting in considerable distortion of the pressed body. When a BN article which has been subjected to cold-pressing undergoes heat-sintering in the usual manner, it has been found that the strains and distortions are released; however, it has also been found that during such heating, the BN article expands considerably due to this release of distortion and the article remains substantially at the expanded size even after the product has been cooled at room temperature. The coefficient of deformation when the article is fired at a temperature of about 1000°C. is about 2 percent and becomes as high as about 4.5 to 5 percent at firing temperatures of from 1,500° to 2,100°C. Thus, it has not been possible to manufacture articles of desirable density and stress by the cold-pressing procedure.

It is a general object of the present invention to overcome the above-described difficulties encountered in the BN molding techniques known heretofore.

More specifically, an object of the invention is to provide a method for sinter-molded of BN whereby molding articles having little distortion and high density as well as other desirable properties are produced.

A further object of this invention is to provide a method for sinter-molding BN which is relatively simple, involving low production costs and which is readily adaptable to the production of a wide range of molded BN products in substantial quantities.

It has been discovered that boron nitride articles having highly desirable characteristics are produced by a simple procedure by taking advantage of the surprisingly large coefficient of expansion of cold-pressure molded articles of boron nitride.

According to the present invention, boron nitride powder is subjected to cold-pressure molding to produce a shaped molded article, the thus-molded article is then confined in a sintering mold wherein the BN article is subjected to heat-sintering under conditions such that the free expansion of the article which occurs during heating is restricted by the sintering mold. A boron nitride article of high density and strength is produced by the present procedure wherein the only pressure supplied during the sintering operation is that of the substantially non-moving walls of the sintering mold.

The present invention is also applicable to the production of sintered boron nitride products from cold-pressed articles prepared from boron nitride powder and a binder.

According to the present invention, the internal dimensions of the sintering mold should be as close as possible to those of the cold-pressed BN article, so that the clearance between the article and the walls of the mold is as near to zero as practical. Since the coefficient of the deformation due to the expansion of a cold-pressed BN article is approximately 5% at 2100°C., the clearance between the mold used for sinter-molding and the article to be sintered is 5 percent or less of each dimension of the molded article in any direction.

The mold used for sintering the BN article is made of a material such as graphite having a low coefficient of expansion, and in particular a coefficient of expansion which is lower than that of boron nitride. Of the materials that can be used for this purpose, graphite is preferred.

Various means may be employed for cold-press molding the BN article from BN powder prior to sintering. For example, methods known in the art such as ordinary press-molding using a metal mold or extrusion-molding may be employed. However, to carry out cold-molding under high pressure and to produce a molded article of uniform density, it is preferable to carry out this step of the process by means of a hydrostatic press. Generally, the cold-pressure molding is carried out under a pressure of about 1 to 4 tons per sq.cm. and more preferably from about 2 to 3 tons per sq. cm.

Prior to cold-press molding the BN powder to form the cold-pressed BN article, a binder may be combined with the powder if desired. Binders generally used in the art for this purpose may be employed, particularly organic binders such as polyethylene glycol and the like.

The crystal structure of the boron nitride article formed by cold-press molding is highly strained and distorted due to the application of high pressure. According to the present invention, the distortion and strains on the crystal structure of the BN are relieved by heating the article at high temperature while the article is confined so that its free expansion which has been found to take place when the article is heated, is restricted. It has been found that by carrying out the heat-sintering while the article is confined so that it can expand no more than about 5 percent in any direction, and preferably less, an article of high density and high strength is produced. Thus, according to the present invention, the advantages attained by the hot-pressing procedure known in the art are obtained by a new and much simpler procedure. The only equipment required for the present invention are simple sintering molds with interior dimensions almost the same or only slightly larger than the dimensions of the article to be molded, and which of course must completely enclose the article. The article, contained in the mold, is then simply heated in a furnace to the desired temperature. It is apparent that the present procedure is readily adaptable to the mass production of BN articles of any size and shape.

The following examples further illustrate the best mode currently contemplated for carrying out the present invention, however, they must not be construed as limiting the invention in any manner; examples which include the letter "R" do not illustrate the invention but are included for comparison purposes.

EXAMPLE 1

Cold pressure-molded articles were prepared by molding 23 g. of BN powder by means of a hydrostatic press under pressures of 2 and 3 tons/sq.cm., respectively. Each molded sample was then machined into a cylinder of 24 mm. diameter and 40 mm. length. Two machined samples respectively molded under the pressures of 2 and 3 tons/sq.cm. were selected and inserted into respective graphite molds, each of which was of cylindrical cup shape with a cylindrical wall thickness of 6 mm. and a bottom thickness of 20 mm., and then each mold was closed by a screw plug with a flange of 15 mm. thickness and a threaded plug part of 10 mm. length which was screwed into corresponding screw threads tapped in the mold at its open end.

The two molds containing the machined samples were then heated in a Tanmann furnace to 1500°C. In each case, the clearance between the BN molded sample prior to heating and the graphite mold was 0.2 mm. or less in all directions.

On the other hand, the remaining BN press-molded samples were sintered at 1500°C. according to the conventional method without being placed in molds.

The measured values of specific gravities and transverse strengths relating to the BN sinter-molded articles produced by the above-described two methods are shown in the accompanying Table 1, in which the molded samples designated by Nos. 1 and 2 are those produced by the above-described method according to the invention, and those designated by Nos. 3R and 4R are those produced by the above-described conventional method.

Table 1

| Molded Sample No. | Molding Pressure (ton/sq.cm) | Bulk Specific Gravity of Pressed Article | Bulk Specific Gravity of Sintered Article | Transverse Strength of sintered Article (kg./sq.cm.) |
| --- | --- | --- | --- | --- |
| 1 | 2 | 1.546 | 1.417 | 181.8 |
| 2 | 3 | 1.618 | 1.491 | 231.8 |
| 3R | 2 | 1.543 | 1.346 | 141.2 |
| 4R | 3 | 1.596 | 1.370 | 180.0 |

EXAMPLE 2

This example illustrates the aforementioned case where a binder is added to BN powder, which is then cold-pressed.

To 23 grams of BN powder, a binder consisting of 0.58 g. of polyethylene glycol (Carbowax No. 1500, a product of Solkawa Chemical Co., Tokyo) dissolved in acetone was added and mixed uniformly in a ball mill. Then the resulting mixture powder, after being dried by infrared rays to vaporize the acetone, was molded under pressures of 2 and 3 tons/sq.cm. and machined into samples measuring 24 mm. in diameter and 40 mm. in length exactly as in Example 1. Sintering of these samples and comparative measurements thereon were carried also as in Example 1.

The comparative results are shown in the accompanying Table 2, in which the samples produced by the example method of the invention are designated by sample Nos. 5 and 6, and those produced by the conventional method are designated by sample Nos. 7R and 8R.

Table 2

| Molded Sample No. | Molding Pressure (ton/sq.cm.) | Bulk Specific Gravity of Pressed Article | Bulk Specific Gravity of Sintered Article | Transverse Strength of sintered Article (kg.sq.cm.) |
| --- | --- | --- | --- | --- |
| 5 | 2 | 1.662 | 1.495 | 223.5 |
| 6 | 3 | 1.705 | 1.521 | 281.3 |
| 7R | 2 | 1.668 | 1.410 | 181.3 |
| 8R | 3 | 1.710 | 1.431 | 226.0 |

As is apparent from the foregoing examples and results, sintered articles produced by the method of the present invention have excellent properties, exhibiting an increase of from 6 to 9 percent in bulk specific gravity and an increase of from 15 to 23 percent in transverse strength over those of similar articles produced by the conventional method.

As described above, by the method of the present invention, it is possible to prevent the lowering of the specific gravity of the sintered product which was heretofore unavoidable, and to improve substantially the transverse strength of the product.

Another advantage of the present invention is that it affords the production of large BN sinter-molded articles in a relatively simple manner without the necessity of using large-scale equipment such as required for the hog-press method, so that the method of the invention is readily applicable to quantity production with lowered production costs.

Therefore, the present invention greatly facilitates production of a wide range of products including high-temperature refractory materials, crucibles and boats for purification of high-purity metals, specimen supports for levitation melting, high-frequency insulators, and high-temperature bearings.

Although this invention has been described with respect to particular examples of procedure, it is not to be so limited as changes and modifications may be made therein which are all within the full intended scope of the invention, as defined by the appended claims.

We claim:

1. In a method for manufacturing a sintered and shaped body consisting essentially of boron nitride and having an improved transverse strength
   wherein a powder consisting essentially of boron nitride is subjected to cold-pressure molding under high pressure to obtain a solid molded boron nitride article of the desired shape and said molded article is sintered at a temperature of about 1500° to 2,100°C., the improvement which comprises
   placing said thus molded boron nitride article within a sintering mold which is made of a material having a linear thermal expansion coefficient smaller than that of said boron nitride molded article and which has dimensions such that the clearance between said molded article and the mold is small enough that upon heating to the sintering temperature said boron nitride article will expand to contact the walls of said mold,
   heat-sintering said boron nitride article thus confined in a mold by placing the mold confining said boron nitride article into a furnace and then heating said mold to a temperature ranging between about 1500° and 2100°C., while no outer pressure is applied to said mold, said mold thereby restricting the expansion of said article whereby sintering is effected under only that pressure resulting from the restricting mold.

2. A method according to claim 1, wherein the high pressure employed in the step of cold-pressure molding is about 2 to 3 tons per sq.cm.

3. A method according to claim 1, wherein the mold is made of graphite.

4. A method according to claim 1, wherein the clearance existing between said mold and said article is less than 5 percent of any dimension of said molded article in the direction of the clearance.

5. A method according to claim 1 in which the particle size of the boron nitride powder is up to 1 micron.

6. In a method for manufacturing a sintered and shaped boron nitride body wherein
   a mixture of boron nitride powder and an organic binder is subjected to cold-pressure molding under a high pressure to obtain a solid molded article of the desired shape and then said molded article is sintered at a temperature of about 1500° to 2100°C., the improvement whereby a shaped boron nitride body having improved transverse strength is obtained which comprises
   after shaping said boron nitride article by cold pressure molding, placing said thus molded boron nitride article within a sintering mold which is made of a material having a linear thermal expansion coefficient smaller than that of said boron nitride molded article and which has dimensions such that the clearance between said molded article and the mold is small enough that upon heating to the sintering temperature said boron nitride article will expand to contact the walls of said mold,
   heat-sintering said boron nitride article thus confined in a mold by placing the mold confining said boron nitride article into a furnace and then heating said mold to a temperature ranging between about 1500° and 2100°C. while no outer pressure is applied to said mold, said mold thereby restricting the expansion of said article whereby sintering is effected under only that pressure resulting from the restricting mold.

7. A method according to claim 6, wherein the clearance existing between said mold and said article is less than 5% of any dimension of said molded article in the direction of the clearance.

8. A method according to claim 6 in which said binder consists of polyethylene glycol.

9. A method according to claim 6 in which said binder consists of polyethylene glycol which is present in an amount of about 2.5 parts by weight per 100 parts by weight of boron nitride.

10. A method according to claim 6, wherein said binder consists of polyethylene glycol in an amount of about 2.5 parts by weight per 100 parts by weight of boron nitride, and the mixture of boron nitride powder and binder is prepared by drying a mixture of boron nitride powder and poly-ethylene glycol dissolved in a solvent for the binder.

11. In a process for manufacturing a sintered and shaped boron nitride body by cold-pressure molding boron nitride powder to form a shaped article and then sintering said article at a temperature of about 1500° to 2100°C., the improvement which comprises
   after shaping said boron nitride article by cold-pressure molding, placing said thus-molded boron nitride article within a sintering mold which is made of a material having a linear thermal expansion coefficient smaller than that of said boron nitride molded article and which has dimensions such that the clearance between said molded article and the mold is small enough that upon heating to the sintering temperature said the boron nitride article will expand to contact the walls of said mold and then
   heat-sintering said boron nitride article thus confined in a mold by placing the mold confining said boron nitride article into a furnace and then heating said mold to a temperature ranging between about 1500° and 2100°C., while no outer pressure is applied to said mold, said mold thereby restricting the expansion of said article.

12. A method according to claim 11, wherein the mold is made of graphite.

13. A method according to claim 11, wherein the clearance existing between said mold and said article is less than 5 percent of any dimension of said molded article in the direction of the clearance.

* * * * *